United States Patent
Wu et al.

(10) Patent No.: US 8,587,745 B2
(45) Date of Patent: Nov. 19, 2013

(54) LIQUID CRYSTAL DISPLAY DEVICE AND FIXING DEVICE THEREOF

(75) Inventors: Zexin Wu, Shenzhen (CN); Guofu Tang, Shenzhen (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 35 days.

(21) Appl. No.: 13/379,820

(22) PCT Filed: Nov. 2, 2011

(86) PCT No.: PCT/CN2011/081695
§ 371 (c)(1),
(2), (4) Date: Dec. 21, 2011

(87) PCT Pub. No.: WO2013/060035
PCT Pub. Date: May 2, 2013

(65) Prior Publication Data
US 2013/0100372 A1    Apr. 25, 2013

(30) Foreign Application Priority Data
Oct. 24, 2011    (CN) .......................... 2011 2 0408256

(51) Int. Cl.
*G02F 1/1333*    (2006.01)
(52) U.S. Cl.
USPC .......................................................... 349/58

(58) Field of Classification Search
None
See application file for complete search history.

(56) References Cited

U.S. PATENT DOCUMENTS

| | | | |
|---|---|---|---|
| 8,120,722 B2 * | 2/2012 | Jung et al. | 349/58 |
| 2010/0165231 A1 * | 7/2010 | Ho et al. | 349/58 |
| 2010/0171900 A1 * | 7/2010 | Lee | 349/58 |
| 2012/0050635 A1 * | 3/2012 | Yoo et al. | 349/58 |

* cited by examiner

*Primary Examiner* — Richard Kim
(74) *Attorney, Agent, or Firm* — Troutman Sanders LLP

(57) ABSTRACT

A liquid crystal display (LCD) device and a fixing device thereof are disclosed. The LCD device comprises a light source, a light guide plate and an LCD panel. The fixing device comprises a side plate, a top plate perpendicularly extending from an upper end of the side plate, a partition plate perpendicularly extending from a middle portion of the side plate, and an abutting plate perpendicularly extending from a lower end of the side plate. The partition plate, the top plate and the side plate form a first snap-fit groove for receiving the LCD panel. The partition plate, the abutting plate and the side plate form a second snap-fit groove for receiving the light source. A lower end of the abutting plate is further connected with a supporting portion for supporting the light guide plate, and a partition is formed between the supporting portion and the abutting plate.

15 Claims, 2 Drawing Sheets

LIQUID CRYSTAL DISPLAY DEVICE AND FIXING DEVICE THEREOF

BACKGROUND

1. Technical Field

The present disclosure relates to the field of liquid crystal displaying technologies, and more particularly, to a liquid crystal display (LCD) device and a fixing device thereof.

2. Description of Related Art

LCDs are a kind of flat panel displays (FPDs) that display images by virtue of properties of liquid crystal materials. Because of their lighter weight, thinner profile, lower driving voltage required and lower power consumption as compared to other kinds of display devices, the LCDs have become the mainstream product in the display market.

As shown in FIG. 1, an LCD device generally comprises an LCD panel 4, a front frame 5, a light guide plate 3, a plastic frame 1, a light source 6 and a backplate 2. The backplate 2 comprises a baseplate 21 and a sidewall 22. The light source 6 is fixed on the sidewall 22 of the backplate 2. The plastic frame 1 comprises a side plate 11 and a partition plate 12 perpendicularly extending from the side plate 11. The backplate 2 is located below the partition plate 12, and the sidewall 22 of the backplate 2 is fixedly connected with the side plate 11 of the plastic frame 1. The light guide plate 3 is located below the partition plate 12 and fixedly connected with the backplate 2. The LCD panel 4 is placed on the partition plate 12. The front frame 5 is disposed over the plastic frame 1, which comprises two side edges perpendicular to each other: one of the side edges is fixedly connected to the side plate 11 of the plastic frame 1 and the other side edge cooperates with the partition plate 12 of the plastic frame 1 to fix the LCD panel 4. The light guide plate 3 and the backplate 2 may be connected through use of screws or through use of other fixing mechanisms, and a predetermined distance is kept between the light guide plate 3 and the light source 6.

In conventional LCD device designs, fixing structures for the front frame, the plastic frame and the light guide plate must be formed through use of separate molds respectively and then assembled together, which makes the manufacturing process of the LCD devices very complex.

BRIEF SUMMARY

The primary objective of the present disclosure is to provide a fixing device for an LCD device, which is intended to reduce the mold cost of components of the LCD device.

The present disclosure provides a fixing device for an LCD device. The fixing device comprises a side plate, a top plate perpendicularly extending from an upper end of the side plate, a partition plate perpendicularly extending from a middle portion of the side plate, and an abutting plate perpendicularly extending from a lower end of the side plate. The partition plate, the top plate and the side plate form a first snap-fit groove, and the partition plate, the abutting plate and the side plate form a second snap-fit groove. A lower end of the abutting plate is further connected with a supporting portion, and a partition is formed between the supporting portion and the abutting plate.

Preferably, the fixing device is formed integrally from an aluminum profile.

The present disclosure further provides an LCD device, which comprises a light source, a light guide plate, an LCD panel, and a fixing device for fixing the light source, the light guide plate and the LCD panel. The fixing device comprises a side plate, a top plate perpendicularly extending from an upper end of the side plate, a partition plate perpendicularly extending from a middle portion of the side plate and an abutting plate perpendicularly extending from a lower end of the side plate. The partition plate, the top plate and the side plate form a first snap-fit groove for receiving the LCD panel, and the partition plate, the abutting plate and the side plate form a second snap-fit groove for receiving the light source. A lower end of the abutting plate is further connected with a supporting portion, and a partition is formed between the supporting portion and the abutting plate. The light guide plate is disposed on the supporting portion and abuts against the partition.

Preferably, the light source comprises a printed circuit board (PCB) and light emitting diodes (LED) disposed on the PCB. The LED has a light emitting surface, the light source is received in the second snap-fit groove, and the PCB is fixed on the side plate.

Preferably, the light guide plate has a light incident surface abutting against the partition and having a distance from the light emitting surface of the LED.

Preferably, a line connecting an edge of the light emitting surface of the LED with an edge of the light incident surface of the light guide plate and a horizontal plane include an angle of greater than or equal to 60° therebetween.

Preferably, the LCD device further comprises a reflective sheet disposed below the light guide plate.

Preferably, the LCD device further comprises a backplate. The backplate comprises a first fixing portion for supporting the reflective sheet and a second fixing portion connected with a lower end of the first fixing portion, and the second fixing portion is fixedly connected with the supporting portion.

Preferably, a cushion that separates the LCD panel from the fixing device is disposed in the first snap-fit groove.

Preferably, the cushion is a cushioning foam or rubber.

The present disclosure further provides an LCD device, which comprises a light source, a light guide plate, an LCD panel, and a fixing device for fixing the light source, the light guide plate and the LCD panel. The fixing device comprises a side plate, a top plate perpendicularly extending from an upper end of the side plate, a partition plate perpendicularly extending from a middle portion of the side plate and an abutting plate perpendicularly extending from a lower end of the side plate. The partition plate, the top plate and the side plate form a first snap-fit groove for receiving the LCD panel, and a cushion that separates the LCD panel from the fixing device is disposed in the first snap-fit groove. The partition plate, the abutting plate and the side plate form a second snap-fit groove for receiving the light source. A lower end of the abutting plate is further connected with a supporting portion, and a partition is formed between the supporting portion and the abutting plate. The light guide plate has a light incident surface abutting against the partition.

Preferably, the light source comprises a printed circuit board (PCB) and light emitting diodes (LED) disposed on the PCB. The LED has a light emitting surface, the light source is received in the second snap-fit groove and the PCB is fixed on the side plate.

Preferably, the light incident surface of the light guide plate has a distance from the light emitting surface of the LED.

Preferably, a line connecting an edge of the light emitting surface of the LED with an edge of the light incident surface of the light guide plate and a horizontal plane include an angle of greater than or equal to 60° therebetween.

Preferably, the cushion is a cushioning foam or rubber.

Preferably, the LCD device further comprises a reflective sheet disposed below the light guide plate.

Preferably, the LCD device further comprises a backplate. The backplate comprises a first fixing portion for supporting the reflective sheet and a second fixing portion connected with a lower end of the first fixing portion, and the second fixing portion is fixedly connected with the supporting portion.

According to the present invention, by forming the fixing device for an LCD device integrally from an aluminum profile, the assembling process of the LCD device is simplified; and because the light source is fixed directly on the fixing device, the heat dissipating effect for the light source can be improved. Furthermore, because the design of pressing the light guide plate against the partition shortens the distance between the light source and the light guide plate, the thickness of the LCD device is reduced and the light coupling efficiency of the light guide plate is improved, and moreover, potential damage to the light source when being pressed by the thermally expanded light guide plate is avoided.

Hereinafter, implementations, functional features and advantages of the present disclosure will be further described with reference to embodiments thereof and the attached drawings.

DETAILED DESCRIPTION

Hereinbelow, the present disclosure will be further described with reference to the attached drawings and embodiments thereof. It shall be understood that, the embodiments described herein are only intended to illustrate but not to limit the present disclosure.

Figure 1:
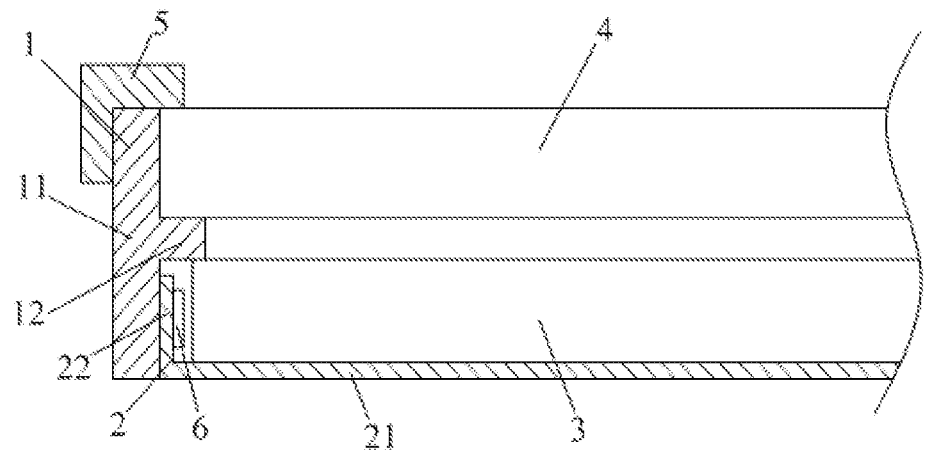
FIG. 1 is a schematic partial structural view of a LCD device in prior art.
Figure 2:
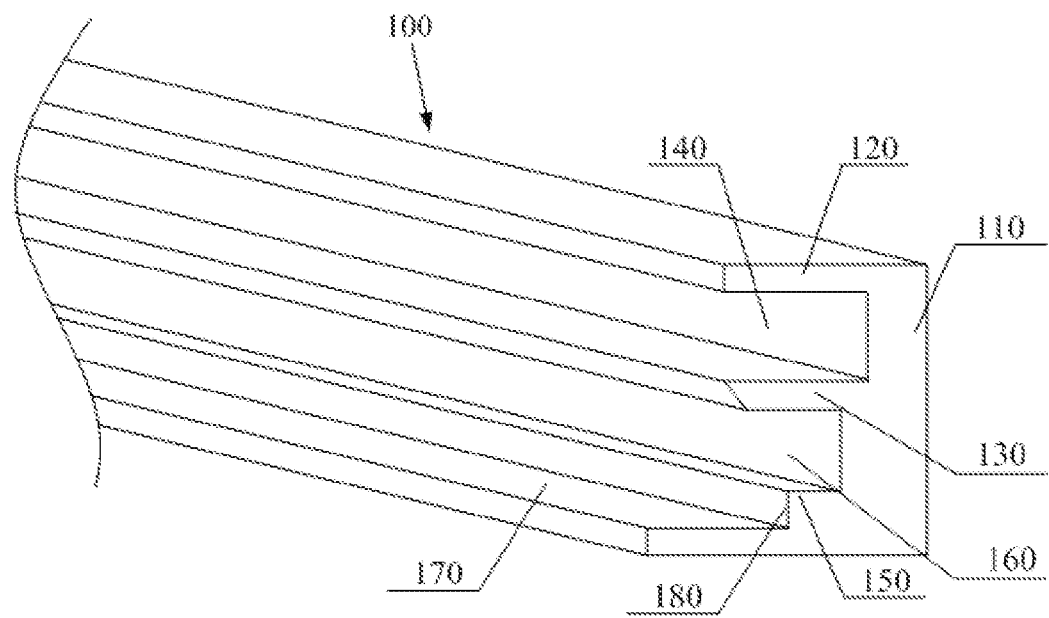
FIG. 2 is a schematic structural view of a fixing device for an LCD device according to the present disclosure.

Referring to FIG. 2, which is a schematic structural view of a fixing device 100 for an LCD device according to the present disclosure. The fixing device 100 comprises a side plate 110, and a top plate 120 perpendicularly connected with the side plate 110 is disposed at an upper end of the side plate 110. The fixing device 100 further comprises a partition plate 130 perpendicularly connected with a middle portion of the side plate 110. The partition plate 130, the top plate 120 and the side plate 110 form a first snap-fit groove 140. An abutting plate 150 perpendicularly connected with the side plate 110 is disposed at a lower end of the side plate 110. The abutting plate 150, the partition plate 130 and the side plate 110 form a second snap-fit groove 160. A lower end of the abutting plate 150 is further connected with a supporting portion 170, and a partition 180 is formed between the supporting portion 170 and the abutting plate 150. The fixing device 100 is formed integrally. Specifically, the fixing device 100 may be formed integrally from an aluminum profile through use of an extrusion die.

Figure 3:
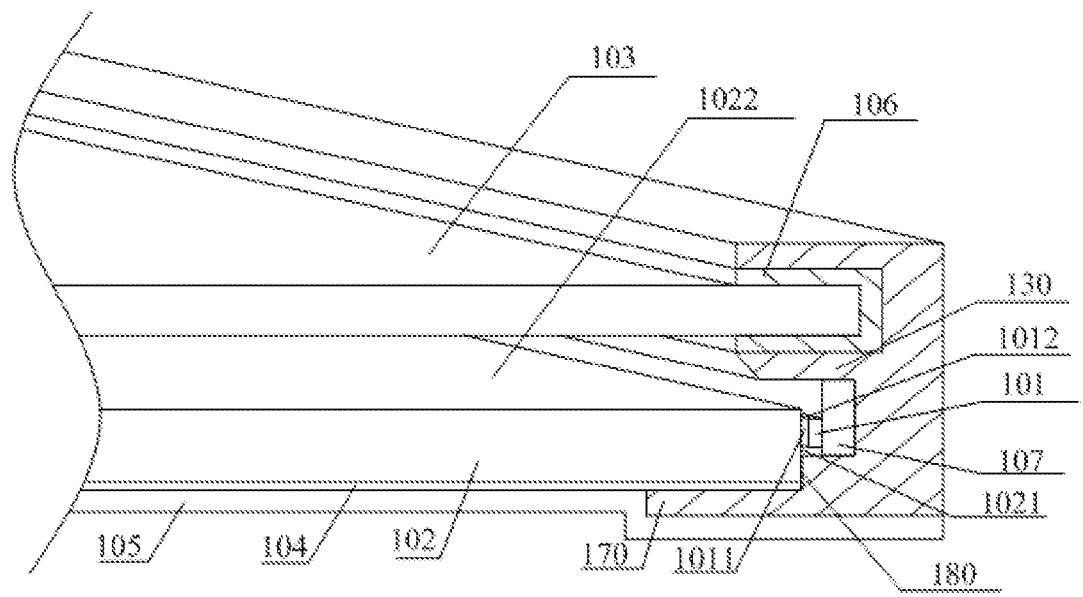
FIG. 3 is a schematic partial structural view of the LCD device according to the present disclosure.

Referring to FIG. 2 and FIG. 3, a schematic partial structural view of an LCD device according to the present disclosure is shown in FIG. 3. The LCD device comprises a light source, a light guide plate 102, an LCD panel 103, a reflective sheet 104 and a backplate 105.

The light source comprises a printed circuit board (PCB) 107 and light emitting diodes (LED) 101 disposed on the PCB 107, and the LED 101 has a light emitting surface 1011 and a side surface 1012. The light source is received in the second snap-fit groove 170, and the PCB 107 may be fixed on the side plate 110 through use of screws or an adhesive tape. An edge of the LCD panel 103 is received in the first snap-fit groove 140.

The light guide plate 102 is disposed on the supporting portion 170, and the light guide plate 102 has a light incident surface 1021 abutting against the partition 180 and a light exiting surface 1022. The reflective sheet 104 is disposed below the light guide plate 102, and an end of the reflective sheet 104 is disposed between the light guide plate 102 and the supporting portion 170. The backplate 105 comprises a first fixing portion located below the reflective sheet 104 and a second fixing portion connected with a lower end of the first fixing portion. The first fixing portion is configured to support the reflective sheet 104, and the second fixing portion is disposed below and fixedly connected with the supporting portion 170.

Figure 4:
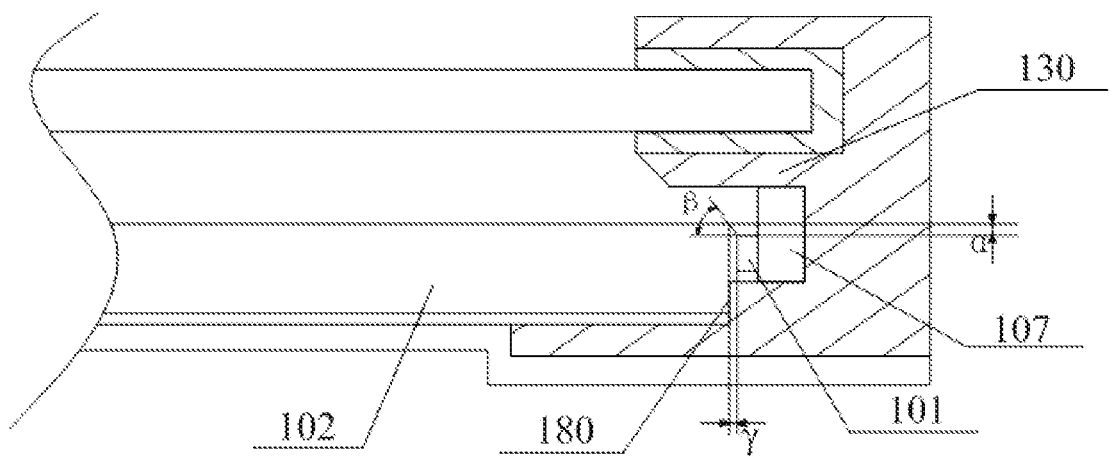
FIG. 4 is a schematic cross-sectional view of the LCD device according to the present disclosure.

As shown in FIG. 4, the light incident surface 1021 of the light guide plate 102 abuts against the partition 180 and has a distance $\gamma$ from the light emitting surface 1011 of the LED 101. A difference in height between the light exiting surface 1022 of the light guide plate 102 and the side surface 1012 of the LED 101 is $\alpha$. A line connecting an edge of the light emitting surface 1011 of the LED 101 with an edge of the light incident surface 1021 of the light guide plate 102 and a horizontal plane include an angle $\beta$. As the conventional LED 101 generally has a light emitting angle of 120° (i.e., a single-side light emitting angle of the LED 101 is 60°), a value of 2$\beta$ should be greater than or equal to 120° in order to make full use of light rays emitted from the LED 101 (i.e., the value of $\beta$ should be greater than or equal to) 60°. In this case, the smaller the $\gamma$ is, the smaller the $\alpha$ will be (i.e., the thinner the light guide plate 102 will be), and this further reduces the thickness of the LCD device. In addition, if the $\gamma$ becomes smaller while the a remains the same, then the value of the $\beta$ will become greater; and as a result, all of the light rays emitted from the light emitting surface 1011 of the LED 101 will propagate into the light guide plate 102 through the light incident surface 1021 of the light guide plate 102, so the utilization ratio of the light is further improved. Therefore, this design of the partition 180 can make the $\gamma$ very small. Consequently, the thickness of the LCD device is reduced and the light coupling efficiency of the light guide plate 102 is improved, and moreover, potential damage to the light source when being pressed by the thermally expanded light guide plate 102 is avoided.

According to the embodiments of the present invention, by forming the fixing device for an LCD device integrally from an aluminum profile, the assembling process of the LCD device is simplified; and because the light source is fixed directly on the fixing device, the heat dissipating effect for the light source can be improved. Furthermore, because the design of pressing the light guide plate 102 against the partition 180 shortens the distance between the light source and the light guide plate 102, the thickness of the LCD device is reduced and the light coupling efficiency of the light guide plate 102 is improved, and moreover, potential damage to the light source 101 when being pressed by the thermally expanded light guide plate 102 is avoided.

A cushion 106 that separates the LCD panel 103 from the first snap-fit groove 140 is disposed in the first snap-fit groove 140. The cushion 106 may be a cushioning foam or rubber, and is used to protect the LCD panel 103 from being damaged during the assembling process.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

The invention claimed is:

1. An LCD device, comprising a light source, a light guide plate, an LCD panel, and a fixing device for fixing the light source, the light guide plate and the LCD panel, wherein the fixing device comprises a side plate, a top plate perpendicularly extending from an upper end of the side plate, a partition plate perpendicularly extending from a middle portion of the side plate and an abutting plate perpendicularly extending from a lower end of the side plate, the partition plate, the top plate and the side plate form a first snap-fit groove for receiving the LCD panel, the partition plate, the abutting plate and the side plate form a second snap-fit groove for receiving the light source, a lower end of the abutting plate is further connected with a supporting portion, a partition is formed between the supporting portion and the abutting plate, and the light guide plate is disposed on the supporting portion and abuts against the partition.

2. The LCD device of claim 1, wherein the light source comprises a printed circuit board (PCB) and light emitting diodes (LED) disposed on the PCB, the LED has a light emitting surface, the light source is received in the second snap-fit groove and the PCB is fixed on the side plate.

3. The LCD device of claim 2, wherein the light guide plate has a light incident surface abutting against the partition and having a distance from the light emitting surface of the LED.

4. The LCD device of claim 3, wherein a line connecting an edge of the light emitting surface of the LED with an edge of the light incident surface of the light guide plate and a horizontal plane include an angle of greater than or equal to 60° therebetween.

5. The LCD device of claim 1, further comprising a reflective sheet disposed below the light guide plate.

6. The LCD device of claim 5, characterized in further comprising a backplate, wherein the backplate comprises a first fixing portion for supporting the reflective sheet and a second fixing portion connected with a lower end of the first fixing portion, and the second fixing portion is fixedly connected with the supporting portion.

7. The LCD device of claim 1, wherein a cushion that separates the LCD panel from the fixing device is disposed in the first snap-fit groove.

8. The LCD device of claim 7, wherein the cushion is a cushioning foam or rubber.

9. An LCD device, comprising a light source, a light guide plate, an LCD panel, and a fixing device for fixing the light source, the light guide plate and the LCD panel, wherein the fixing device comprises a side plate, a top plate perpendicularly extending from an upper end of the side plate, a partition plate perpendicularly extending from a middle portion of the side plate and an abutting plate perpendicularly extending from a lower end of the side plate; the partition plate, the top plate and the side plate form a first snap-fit groove for receiving the LCD panel, and a cushion that separates the LCD panel from the fixing device is disposed in the first snap-fit groove; the partition plate, the abutting plate and the side plate form a second snap-fit groove for receiving the light source; a lower end of the abutting plate is further connected with a supporting portion, and a partition is formed between the supporting portion and the abutting plate; and the light guide plate has a light incident surface abutting against the partition.

10. The LCD device of claim 9, wherein the light source comprises a PCB and LEDs disposed on the PCB, the LED has a light emitting surface, the light source is received in the second snap-fit groove and the PCB is fixed on the side plate.

11. The LCD device of claim 10, wherein the light incident surface of the light guide plate has a distance from the light emitting surface of the LED.

12. The LCD device of claim 11, wherein a line connecting an edge of the light emitting surface of the LED with an edge of the light incident surface of the light guide plate and a horizontal plane include an angle of greater than or equal to 60° therebetween.

13. The LCD device of claim 9, wherein the cushion is a cushioning foam or rubber.

14. The LCD device of claim 9, further comprising a reflective sheet disposed below the light guide plate.

15. The LCD device of claim 14, further comprising a backplate, wherein the backplate comprises a first fixing portion for supporting the reflective sheet and a second fixing portion connected with a lower end of the first fixing portion, and the second fixing portion is fixedly connected with the supporting partition.

* * * * *